US009221535B2

(12) United States Patent
Gordon et al.

(10) Patent No.: US 9,221,535 B2
(45) Date of Patent: Dec. 29, 2015

(54) ADAPTIVE REMAINING USEFUL LIFE BALANCING CONTROL SYSTEM AND METHOD FOR MULTI-ENGINE SYSTEMS (71) Applicant: HONEYWELL INTERNATIONAL INC., Morristown, NJ (US)

(72) Inventors: Grant Gordon, Peoria, AZ (US); Hector Alonso Peralta-Duran, Avondale, AZ (US); Richard Ling, Scottsdale, AZ (US); Michael Gorelik, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 120 days.

(21) Appl. No.: 14/030,039

(22) Filed: Sep. 18, 2013

(65) Prior Publication Data
US 2015/0081193 A1 Mar. 19, 2015

(51) Int. Cl.
*F02C 9/28* (2006.01)
*G05B 9/03* (2006.01)
(Continued)

(52) U.S. Cl.
CPC . *B64C 27/04* (2013.01); *F02C 9/28* (2013.01); *F02C 9/42* (2013.01); *G05B 23/0283* (2013.01);
(Continued)

(58) Field of Classification Search
CPC .... G05B 13/042; G05B 23/0245; G05B 9/03; G05B 23/0283; G05B 23/0221; G07C 3/00; F01D 17/02; H04L 41/0681; H04L 41/0659; G09B 9/46; G09B 9/44; G05D 1/0669; G01R 15/18; F01N 3/0807
USPC ....... 701/7, 100; 702/34, 185; 703/8; 714/43; 370/360; 60/772, 277; 700/177; 324/526
See application file for complete search history.

(56) References Cited

U.S. PATENT DOCUMENTS 4,488,851 A   12/1984  Young
4,500,966 A   2/1985   Zagranski et al.
(Continued)

FOREIGN PATENT DOCUMENTS

EP   199038 A1    10/1986
EP   1420153 A2   5/2004
EP   2221699 A2   8/2010

OTHER PUBLICATIONS

Davidson, J. B. et al.: "Real-Time Adaptive Control Allocation applied to a High Performance Aircraft" 2001 5th SIAM Conference on Control & Its Applications; source: URL—http://dcb.larc.nasa.gov/DCBStaff/jbd/REPORTS/rtacat01vf.pdf.

(Continued)

*Primary Examiner* — Tuan C. To
*Assistant Examiner* — Yuri Kan
(74) *Attorney, Agent, or Firm* — Ingrassia Fisher & Lorenz, P.C.

(57) ABSTRACT

A system and method of adaptively managing a plurality of engines in a multi-engine system, where each engine comprises hot gas components and non-hot gas components, and each engine exhibits a performance margin and a remaining useful life, includes continuously, and in real-time, determining a plurality of different degradation mechanisms for each of the plurality of engines, and continuously, and in real-time, determining which of the determined degradation mechanisms is most limiting. The engines are controlled, based on the most limiting degradation mechanism, in a manner that the remaining useful lives of each engine are substantially equal. The plurality of different degradation mechanisms of each engine are determined based on the engine performance margin, modeled failure predictions of the hot gas components, and modeled failure predictions of the non-hot gas components.

17 Claims, 3 Drawing Sheets

(51) Int. Cl.
  *B64C 27/04* (2006.01)
  *G05B 23/02* (2006.01)
  *F02C 9/42* (2006.01)

(52) U.S. Cl.
  CPC ...... *G05B 23/0294* (2013.01); *F05D 2220/329* (2013.01); *F05D 2260/81* (2013.01); *F05D 2270/11* (2013.01); *F05D 2270/13* (2013.01)

(56) References Cited

U.S. PATENT DOCUMENTS

| | | | |
|---|---|---|---|
| 5,633,800 A * | 5/1997 | Bankert et al. | 700/177 |
| 6,707,475 B1 | 3/2004 | Snyder | |
| 6,860,100 B1 * | 3/2005 | Bidner et al. | 60/277 |
| 6,917,908 B2 | 7/2005 | Williams | |
| 7,414,544 B2 | 8/2008 | Oltheten et al. | |
| 8,464,980 B2 | 6/2013 | Certain | |
| 2001/0045835 A1 * | 11/2001 | Ahmed | 324/526 |
| 2004/0049715 A1 * | 3/2004 | Jaw | 714/43 |
| 2004/0088991 A1 * | 5/2004 | Gallant et al. | 60/772 |
| 2005/0209823 A1 * | 9/2005 | Nguyen et al. | 702/185 |
| 2005/0234689 A1 * | 10/2005 | Gates et al. | 703/8 |
| 2006/0126608 A1 * | 6/2006 | Pereira et al. | 370/360 |
| 2006/0144997 A1 | 7/2006 | Schmidt et al. | |
| 2008/0161983 A1 * | 7/2008 | Salesse-Lavergne | 701/7 |
| 2010/0204931 A1 | 8/2010 | Ling et al. | |
| 2012/0283963 A1 * | 11/2012 | Mitchell et al. | 702/34 |

OTHER PUBLICATIONS

EP extended search, EP 14182715.4-1802 dated May 2, 2015.

* cited by examiner

ADAPTIVE REMAINING USEFUL LIFE BALANCING CONTROL SYSTEM AND METHOD FOR MULTI-ENGINE SYSTEMS

TECHNICAL FIELD

The present invention generally relates to remaining useful life analyses, and more particularly relates to a system and method for adaptively controlling the operation of a multi-engine system to maximize the remaining useful life of the engines while satisfying the demand load.

BACKGROUND

Helicopters typically have two engines that are connected through a combiner transmission to share the load of the rotor. It is desirable to share the load equally between the two engines so that the engines are more likely to deteriorate at the same (or similar) pace, and impart less stress to the combiner transmission. It is even more desirable to manage the deterioration rates such that both engines reach their end of useful lives together. However, this is difficult to achieve unless one can measure the engine deterioration rate in real time. Helicopter engine controllers are typically configured to selectively implement one of a plurality of load sharing control methods, and control logic that selects the control method. These control methods may include, for example, torque matching, a temperature matching, and a speed matching. With the torque matching method, measured engine torque is equalized, with the temperature matching method, measured engine temperatures are equalized, and with the speed matching method, measured engine speeds are equalized.

Regardless of the particular control methodology that is used, when one or both engines are being used at or above normal operational limits, the engines may deteriorate at a relatively rapid rate. There may be situations in which the pilot, utilizing the normal operational limits of the engines, is unable to perform a particular maneuver. In such situations, the pilot may need to exceed the normal operational limits to perform the maneuver. For example, the pilot may be unable to achieve a controlled descent due to lack of power and hence may wish to exceed the normal operational power limits in order to harness all of available engine power. Because such operations can rapidly increase the rate of engine deterioration, it would be useful to have some type of real-time engine condition assessment and management tool to assist the pilot in managing such deteriorating engine conditions. Unfortunately, no such tool is available.

Hence, there is a need for a system and method of real-time engine condition assessment and management to assist the pilot in managing such deteriorating engine conditions. The present invention addresses at least this need.

BRIEF SUMMARY

In one embodiment, a method of adaptively managing a plurality of engines in a multi-engine system, where each engine comprises hot gas components and non-hot gas components, and each engine exhibits a performance margin and a remaining useful life, includes continuously, and in real-time, determining a plurality of different degradation mechanisms for each of the plurality of engines, and continuously, and in real-time, determining which of the determined degradation mechanisms is most limiting. The plurality of engines are controlled, based on the most limiting degradation mechanism, in a manner that the remaining useful lives of each engine are substantially equal. The plurality of different degradation mechanisms of each engine are determined based on the engine performance margin, modeled failure predictions of the hot gas components, and modeled failure predictions of the non-hot gas components.

In another embodiment, a system for adaptively managing a multi-engine system includes a plurality of engines and a plurality of engine controls. Each engine comprises hot gas components and non-hot gas components, and each engine exhibits a performance margin and a remaining useful life. Each control is in operable communication with each other, and is associated with a different one of the plurality of engines. Each engine control is configured to continuously, and in real-time, determine a plurality of different degradation mechanism for at least its associated engine, continuously, and in real-time, determine which of the determined degradation mechanism for at least its associated engine is most limiting and control operations of at least its associated engine, based on the most limiting degradation mechanism, in a manner that the remaining useful lives of each engine are substantially equal. The plurality of different degradation mechanisms of each engine are determined based on the engine performance margin, modeled failure predictions of the hot gas components, and modeled failure predictions of the non-hot gas mechanical components.

In yet another embodiment, a method of adaptively managing a first engine and a second engine in a twin-engine system, where the first and second engines each comprise hot gas components and non-hot gas components, and the first and second engines each exhibit a performance margin and a remaining useful life, is provided. A first engine performance-based degradation mechanism for the first engine is determined continuously, and in real-time. The first engine performance-based degradation mechanism is based on the performance margin of the first engine. A second engine performance-based degradation mechanism for the second engine is determined continuously, and in real-time. The second engine performance-based degradation mechanism is based on the performance margin of the second engine. A first engine hot-gas-component-based degradation mechanism for the first engine is determined continuously, and in real-time. The first engine hot-gas-component-based degradation mechanism is based on modeled failure predictions of hot gas components within the first engine. A second engine hot-gas-component-based degradation mechanism for the second engine is determined continuously, and in real-time. The second engine hot-gas-component-based degradation mechanism is based on modeled failure predictions of hot gas components within the second engine. A first engine non-hot-gas-component-based degradation mechanism for the first engine is determined continuously, and in real-time. The first engine non-hot-gas-component-based degradation mechanism is based on modeled failure predictions of non-hot gas components within the first engine. A second engine non-hot-gas-component-based degradation mechanism for the second engine is determined continuously, and in real-time. The second engine non-hot-gas-component-based degradation mechanism is based on modeled failure predictions of non-hot gas components within the second engine. A determination is made, continuously, and in real-time, which of the determined degradation mechanisms is most limiting. The first and second engines are controlled, based on the most limiting remaining useful life, in a manner that the remaining useful lives of the first and second engines are substantially equal.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Furthermore, there is no intention to be bound by any expressed or implied theory presented in the preceding technical field, background, brief summary, or the following detailed description. In this regard, although embodiments are described herein as being implemented in a rotary-wing aircraft, such as a helicopter, it will be appreciated that the systems and methods described herein may be implemented in various other environments and applications that utilize a multi-engine output. Moreover, although embodiments are described herein as being implemented with two gas turbine engines, other numbers of engines greater than two could be used, and various other engine types, including diesel and combustion engines, may also be used.

Figure 1:
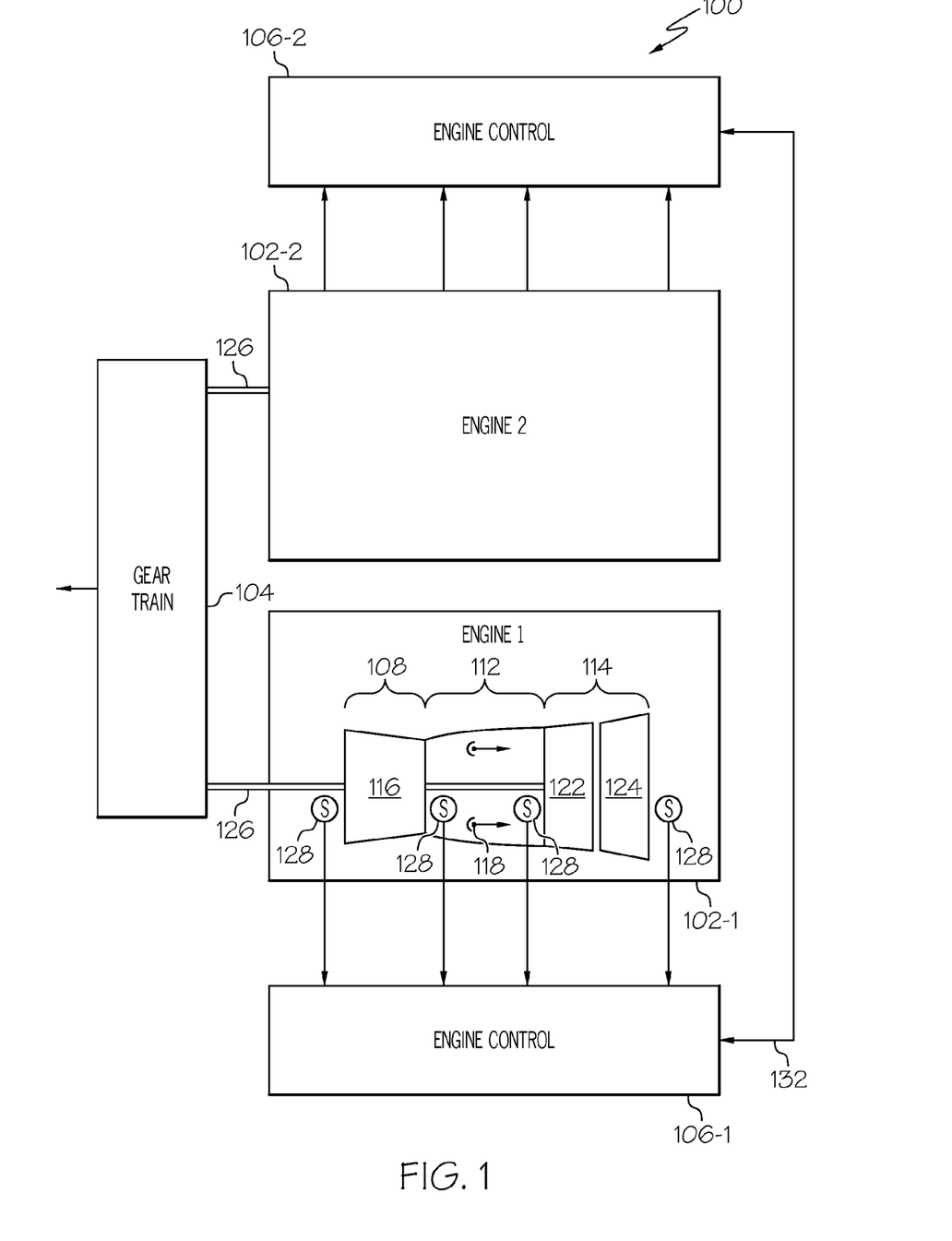
FIG. 1 depicts a high-level functional block diagram of a portion of a multi-engine power train system for a rotary-wing aircraft.

Referring first to FIG. 1, a high-level functional block diagram of a portion of a multi-engine power train system 100 for a rotary-wing aircraft, such as a helicopter, is depicted. The power train includes two engines 102 (a first engine 102-1 and a second engine 102-2), a gear train 104, and two engine controls 106 (a first engine control 106-1 and a second engine control 106-2). It should be noted that although the system 100 of FIG. 1 is depicted as including only two engines 102, it could be implemented with more than this number of engines 102, if needed or desired.

The engines 102, at least in the depicted embodiment, are implemented using gas turbine engines, and more particularly single-spool turbo-shaft gas turbine propulsion engines. Thus, each engine 102 includes a compressor section 108, a combustion section 112, and a turbine section 114. The compressor section 108, which may include one or more compressors 116, draw air into its respective engine 100 and compresses the air to raise its pressure. In the depicted embodiment, each engine includes only a single compressor 116. It will nonetheless be appreciated that each engine 102 may include one or more additional compressors.

No matter the particular number of compressors 116 that are included in the compressor sections 108, the compressed air is directed into the combustion section 112. In the combustion section 112, which includes a combustor assembly 118, the compressed air is mixed with fuel supplied from a non-illustrated fuel source. The fuel and air mixture is combusted, and the high energy combusted air mixture is then directed into the turbine section 114.

The turbine section 114 includes one or more turbines. In the depicted embodiment, the turbine section 114 includes two turbines, a high pressure turbine 122 and a free power turbine 124. However, it will be appreciated that the engines 102 could be configured with more or less than this number of turbines. No matter the particular number, the combusted air mixture from the combustion section 112 expands through each turbine 122, 124, causing it to rotate an associated power shaft 126. The combusted air mixture is then exhausted from the engines 102. The power shafts 126 are each coupled to, and supply a drive torque to, the gear train 104.

The gear train 104 is coupled to receive the drive torque supplied from each of the engines 102. The gear train 104, which may include one or more gear sets, preferably includes at least a combiner transmission, which in turn supplies the combined drive torque to one or more rotors.

The engine controls 106 are each in operable communication with one of the engines 102. In the depicted embodiment, for example, the first engine control 106-1 is in operable communication with the first engine 102-1, and the second engine control 106-2 is in operable communication with the second engine 106-2. Each engine control 106 is configured, among other things, to control the operation of its associated engine 102 in a manner that the remaining useful lives of each engine 102 are substantially equal. To implement this functionality, which is described in more detail below, the engine controls 106 are each coupled to receive various control and performance data from its associated engine 102. Thus, as FIG. 1 further depicts, each engine 102 additionally includes a plurality of sensors 128. Each of the sensors 128 is coupled to its associated engine control 106 and is operable to sense an engine parameter and supply control and performance data representative of the sensed parameter to its associated engine control 106. It will be appreciated that the particular number, type, and location of each sensor 128 may vary. It will additionally be appreciated that the number and types of control and performance data supplied by the sensors 128 may vary depending, for example, on the particular engine type and/or configuration. In the depicted embodiment, however, at least a subset of the depicted sensors 128 supply control and performance data representative of, or that may be used to determine, engine inlet pressure, engine inlet temperature, engine speed, fuel flow, compressor discharge pressure, power turbine inlet temperature, engine torque, shaft horsepower, and thrust, just to name a few.

Figure 2:
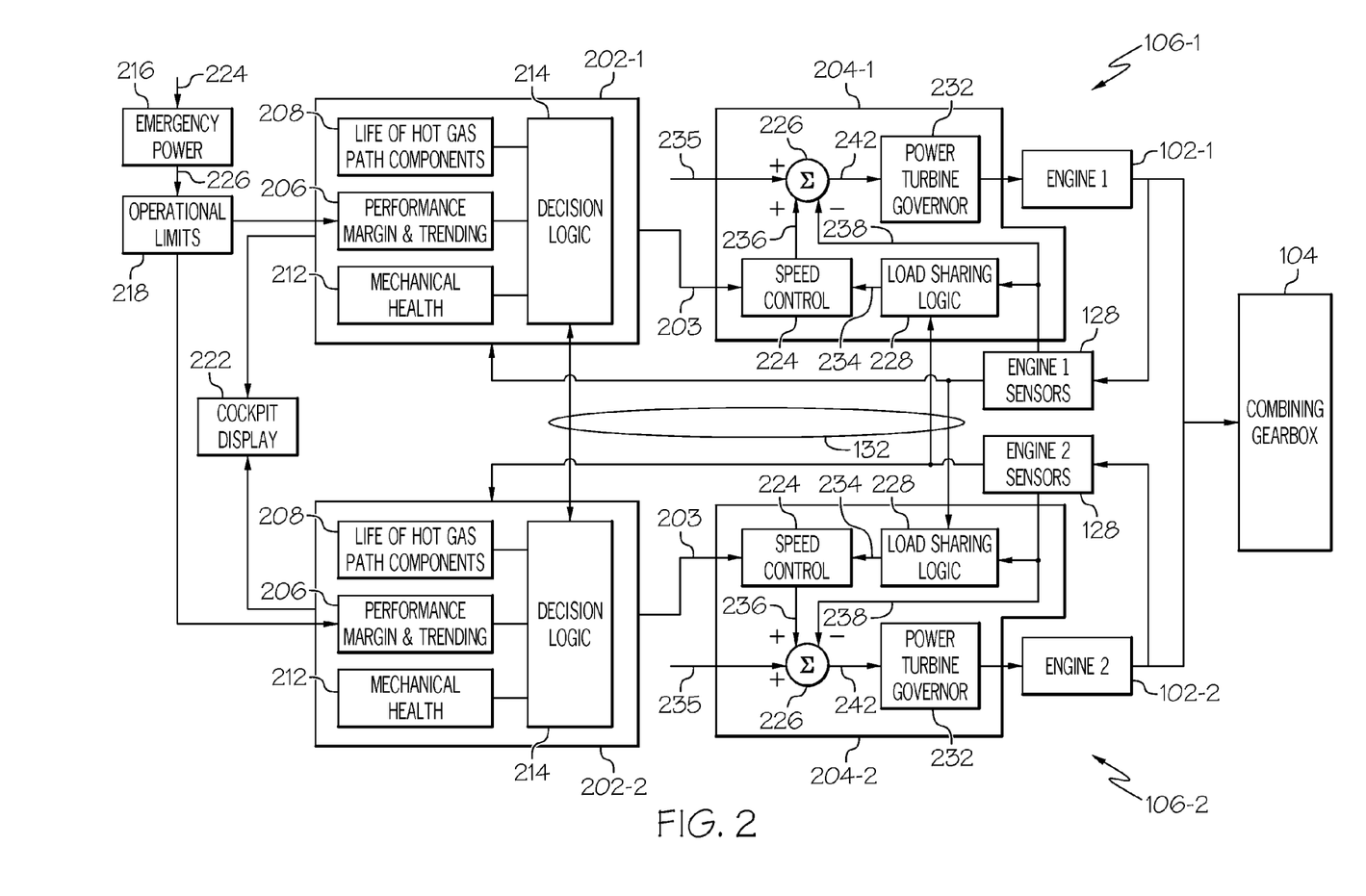
FIG. 2 depicts another functional block diagram of the multi-engine power train system of FIG. 1 that illustrates one embodiment of a particular implementation of the engine controls 106 in more detail.

The engine controls 106, in addition to receiving the various control and performance data from its associated engine 102, are in operable communication with each other via a data link 132. Each engine control 106 is configured to continuously, and in real-time, determine a plurality of different remaining useful lives for at least its associated engine 102, and to continuously, and in real-time, determine which of the determined remaining useful lives for at least its associated engine 102 is most limiting. Each engine control 106 is further configured, based on the most limiting remaining useful life, to control the operations of at least its associated engine 102 in a manner that the remaining useful lives of each engine 102 are substantially equal. It will be appreciated that the engine controls 106 may be variously configured to implement this functionality. Another functional block diagram of the multi-engine power train system 100 that illustrates one embodiment of a particular implementation of the engine controls 106 in more detail is depicted in FIG. 2, and with reference thereto will now be described.

In the depicted embodiment, each engine control 106 includes a remaining useful life module 202 (e.g., 202-1, 202-2) and an engine controller 204 (e.g., 204-1, 204-2). Each remaining useful life module 202 is configured to determine a plurality of different degradation mechanisms that limit the remaining useful life of its associated engine 102, and to determine which degradation mechanism for that engine 102 is most limiting. Each remaining useful life module 202, upon determining which of the determined degradation mechanisms for its associated engine 102 is most limiting, supplies a bias signal 203 representative of this determination to its associated engine controller 204.

Although the plurality of degradation mechanisms that each remaining useful life module 202 determines may vary, in the depicted embodiment, the plurality of different degradation mechanisms of each engine 102 are determined based on the engine performance margin, modeled failure predictions of the hot gas components, and modeled failure predictions of the non-hot gas components. Thus, as FIG. 2 further depicts, each remaining useful life module 202 is configured to implement a performance margin and trending function 206, a hot gas component failure model 208, and a mechanical component health diagnostic model 212, each of which will now be described in more detail.

The performance margin and trending function 206 continuously, and in real-time, determines the performance margin of its associated engine 102. This function 206 also determines the trends of the determined performance margin to determine what may be referred to herein as the "performance-based" degradation mechanism of its associated engine 102. To do so, each performance margin and trending function 206 continuously conducts performance analyses of its associated engine 102. It is noted that the continuous, real-time performance analyses conducted by the performance margin and trending functions 206 may be implemented using any suitable algorithm capable of supplying instantaneous performance margins. Preferably, however, the continuous, real-time performance analyses are preferably conducted using the methodology described in U.S. Pat. No. 8,068,997, entitled "Continuous Performance Analysis System and Method," and assigned to the assignee of the instant application. The entirety of this patent, which issued on Nov. 29, 2011, is hereby incorporated by reference.

The hot gas component failure model 208 continuously, and in real-time, determines the remaining useful life of the hot gas components within its associated engine 102. The particular components whose remaining useful lives are determined may vary, but include various components within the hot-gas path of the engines 102. Some non-limiting examples of these components include turbine wheels, turbine blades, nozzles, turbine disks, combustors, and compressors, just to name a few. Regardless of the particular hot-gas-path components, the hot gas component failure model 208 receives the control and performance data supplied from its associated sensors 128. The hot gas component failure model 208, implementing any one of numerous known reduced order models, uses the control and performance data to model failure predictions of the hot gas components within its associated engine 102. The hot gas component failure model 208, based on the modeled failure predictions, determines what may be referred to herein as the "hot-gas-component-based" degradation mechanism of its associated engine 102.

The mechanical component health diagnostic model 212 continuously, and in real-time, determines the remaining useful life of non-hot gas components associated with its engine 102. The particular components whose remaining useful lives are determined may vary, but include various components that are not within the hot-gas path of the engines 102. Some non-limiting examples of these components include bearings, gears, seals, shaft, values and actuators just to name a few. Regardless of the particular non-hot-gas-path components, the mechanical component health diagnostic model 212 receives the control and performance data supplied from its associated sensors 128. The mechanical component health diagnostic model 212, also implementing any one of numerous known reduced order component health models, uses the control and performance data to model failure predictions of the non-hot-gas components associated with its engine 102. The mechanical component health diagnostic model 212, based on the modeled failure predictions, determines what may be referred to herein as the "non-hot-gas-component-based" degradation mechanism of its associated engine 102.

As was noted above, each remaining useful life module 202 is additionally configured to determine which of the determined degradation mechanisms for its associated engine 102 is most limiting. To do so, and as FIG. 2 further depicts, each remaining useful life module 202 is further configured to implement decision logic 214. The decision logic 214, which may be variously implemented, is configured to determine which of the determined degradation mechanisms for its associated engine 102 is most limiting. As may be appreciated, the decision logic 214 preferably determines that the degradation mechanism that results in the shortest remaining useful life is the one that is the most limiting. Upon making this determination, and as was also noted above, each decision logic 214 supplies the bias signal 203 representative of the determination to its associated engine controller 204.

Before briefly describing the engine controllers 204, it may be seen in FIG. 2 that the depicted multi-engine power train system 100 additionally includes an emergency power enablement function 216, an operational power limits function 218, and a display device 222. The emergency power enablement function 216 is coupled to receive an enablement signal 224 from, for example, a non-illustrated cockpit mounted user interface, such as a button or switch. The emergency power enablement function 216 is configured, upon receipt of the enablement signal 224, to supply a power-limit-increase signal 226 to the operational power limits function 218.

Each operational power limits function 218 is configured, upon receipt of the power-limit-increase signal 226, to increase the operational limits associated with the engine performance analysis. In this regard, it is noted that the engine performance margin of each engine 102 has operational limits associated therewith. During normal, non-emergency power operations (e.g., no enablement signal from the cockpit), the operational limits are associated with nominal design engine operations, and are thus referred to herein as predetermined nominal engine operating limits. When emergency power operations are enabled, this means that the pilot may need to operate one or both engines 102 above the nominal operational limits.

The display device 222 is in operable communication with, and is coupled to receive image rendering display commands from, each of the engine controls 106, and more particularly from each of the remaining useful life modules 204. The display device 222 is configured, upon receipt of the image rendering display commands, to render images of each of the plurality of different degradation mechanisms of each engine 102. It will be appreciated that the display device 222 may be implemented using any one of numerous known display screens suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display device 222 may additionally be implemented as a panel mounted display, a HUD (head-up display) projection, or any one of numerous known technologies. It is additionally noted that the display device 222 may be implemented on any one of numerous types of aircraft flight deck displays. For example, it may be implemented on a multi-function display, a horizontal situation indicator, or a vertical situation indicator.

Turning now to a brief description of the engine controllers 204, it is seen that each includes a speed control 224, a speed error function 226, load sharing logic 228, and a turbine governor 232. Before describing these functions, it is noted that the depicted engine controllers 204 are configured to implement a power turbine speed control function. It will be appreciated, however, that various load matching functions may be implemented through the use of the power turbine speed control function. For example, the engine controllers 204 could instead be configured to implement, through the use of a power turbine speed control function, a load matching function based on temperature or torque, just to name a few.

The speed control 224 within each engine controller 204 is coupled to receive the bias signal 203 from its associated determination logic 214 and a load share signal 234 from its associated load sharing logic 228. The speed control 224 is configured, in response to these signals, to supply a speed control signal 236 to its associated speed error function 226. The speed error function 226 is coupled to receive a speed command 235 from, for example, a non-illustrated cockpit throttle control device. The speed error function 226 is also coupled to receive the speed control signal 236 and a speed feedback signal 238 that is representative of actual engine speed. The speed error function 226, upon receipt of these signals, generates and supplies a speed error signal 242 to the power turbine speed governor 232. The power turbine speed governor 232 in turn controls the flow of fuel to the engine 102 to thereby control its speed.

The load sharing logic 228, as already noted, supplies a load share signal 234 to the speed control 224. In the depicted embodiment, the load sharing logic 228 in each engine controller 204 receives at least a portion of the control and performance data supplied by the sensors 128 associated with both of the engines 102. The load share logic 228 is configured, upon receipt of these data, to determine the load on each of the engines 102 and supply the load share signal 234, which is representative of the determined load on each engine, to the speed control 224.

The system 100 described herein implements a method of adaptively managing a plurality of engines in a multi-engine system 100. For completeness, this method 300 is depicted in flowchart form in FIG. 3, and will now be described. In doing so, it should be noted that the parenthetic reference numerals in the following description refer to like-numbered flowchart symbols in FIG. 3.

Figure 3:
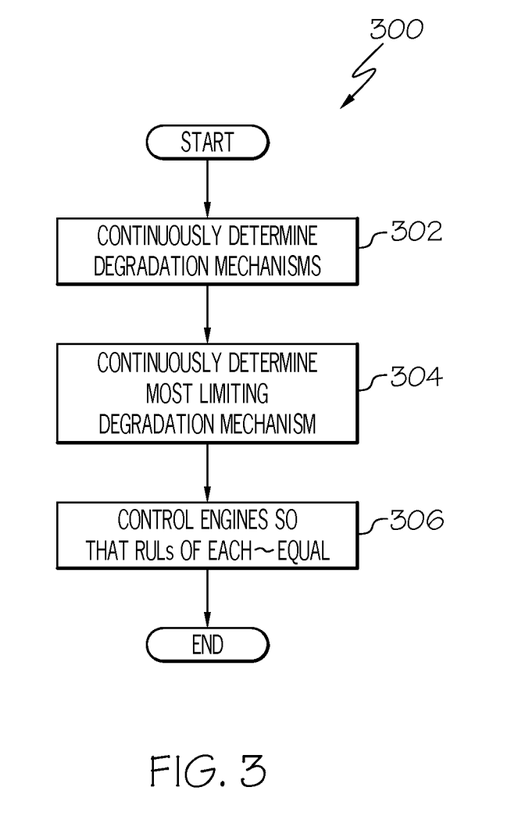
FIG. 3 depicts a method, in flowchart form, for adaptively managing the engines in the multi-engine system of FIGS. 1 and 2.

The depicted method 300 includes the steps of continuously, and in real-time, determining a plurality of different degradation mechanisms for each of the plurality of engines (302). As already described above, these degradation mechanisms are determined based on the engine performance margin, modeled failure predictions of the hot gas components, and modeled failure predictions of the non-hot gas components. Thereafter, a determination is made, continuously and in real-time, as to which of the determined degradation mechanisms is most limiting (304). The plurality of engines 102 are then controlled, based on the most limiting degradation mechanism, in a manner that the remaining useful lives of each engine are substantially equal (306).

The system and method described herein provide real-time engine condition assessment and management to assist aircraft pilots in readily managing deteriorating engine conditions.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of adaptively managing a plurality of engines in a multi-engine system, each engine comprising hot gas components and non-hot gas components and having an associated engine control, each engine exhibiting a performance margin and a remaining useful life, and the engine performance margin of each engine has operational limits associated therewith, the method comprising the steps of:
   continuously, and in real-time, determining, with its associated engine control, a plurality of different degradation mechanisms for each of the plurality of engines;
   continuously, and in real-time, determining, with its associated engine control, which of the determined degradation mechanisms is most limiting;
   controlling each of the plurality of engines, with its associated engine control, based on the most limiting degradation mechanism, in a manner that the remaining useful lives of each engine are substantially equal;
   selectively enabling, with its associated engine control, engine operations above predetermined nominal engine operating limits; and
   upon enabling engine operations above the predetermined nominal engine operating limits, increasing the operational limits associated with the engine performance analysis,
   wherein the plurality of different degradation mechanisms of each engine are determined based on:
      (i) the engine performance margin,
      (ii) modeled failure predictions of the hot gas components, and
      (iii) modeled failure predictions of the non-hot gas components.

2. The method of claim 1, wherein the step of controlling the plurality of engines comprises selectively controlling each of the engines, with its associated engine control, to create a load imbalance between the plurality of engines.

3. The method of claim 1, further comprising:
   supplying each of the determined degradation mechanisms to processor-based decision logic; and
   using the processor-based decision logic to determine which of the determined degradation mechanisms is most limiting.

4. The method of claim 1, wherein the most limiting of the determined degradation mechanism results in a shortest remaining useful life.

5. The method of claim 1, further comprising:
   continuously sensing a plurality of parameters within each engine; and
   continuously updating each of the different degradation mechanisms based on the plurality of sensed parameters.

6. The method of claim 1, wherein:
   each of the plurality of engines generates an output torque; and
   the method further comprises combining the output torque generated by each engine in a combining gear box.

7. The method of claim 1, further comprising:
   selectively displaying, on a display device, one or more of the plurality of different degradation mechanisms of each engine.

8. A system for adaptively managing a multi-engine system, comprising:
   a plurality of engines, each engine comprising hot gas components and non-hot gas components, and each engine exhibiting a performance margin and a remaining useful life, the engine performance margin of each engine having operational limits associated therewith;
   a plurality of engine controls, each engine control in operable communication with each other, and associated with a different one of the plurality of engines, each engine control coupled to selectively receive an enablement signal and configured to:
      continuously, and in real-time, determine a plurality of different degradation mechanism for at least its associated engine;
      continuously, and in real-time, determine which of the determined degradation mechanisms for at least its associated engine is most limiting;
      control operations of at least its associated engine, based on the most limiting degradation mechanism, in a manner that the remaining useful lives of each engine are substantially equal; and
      upon receipt of the enablement signal, to (i) enable engine operations above predetermined nominal engine operating limits and (ii) increase the operational limits associated with the engine performance analysis,
   wherein the plurality of different degradation mechanisms of each engine are determined based on:
      (i) the engine performance margin,
      (ii) modeled failure predictions of the hot gas components, and
      (iii) modeled failure predictions of the non-hot gas mechanical components.

9. The system of claim 8, wherein each engine control is associated with one of the plurality of engines, and each engine control comprises:
- a remaining useful life module configured to (i) determine the plurality of different degradation mechanisms for its associated engines and (ii) determine which of the determined degradation mechanisms for that engine is most limiting; and
- an engine controller configured to control at least its associated engine.

10. The system of claim 9, wherein:
- each remaining useful life module is further configured, upon determining which of the determined degradation mechanisms for its associated engine is most limiting, to supply a signal representative of the determination; and
- each engine controller is associated with one of the remaining useful life modules, each engine controller coupled to receive the signal supplied from its associated remaining useful life module and configured, in response thereto, to control the operations of at least its associated engine.

11. The system of claim 9, wherein each remaining useful life module is configured to implement:
- a performance margin trending function that continuously, and in real-time, determines (i) the performance margin of its associated engines and (ii) trends of the determined performance margin;
- a hot gas component failure model that continuously, and in real-time, determines the remaining useful life of the hot gas components within its associated engine; and
- a mechanical component health diagnostic model that continuously, and in real-time, determines the remaining useful life of non-hot gas components.

12. The system of claim 9, wherein each remaining useful life module is further configured to implement decision logic, the decision logic configured to determine which of the determined degradation mechanisms for its associated engine is most limiting.

13. The system of claim 8, wherein each engine control is configured to determine that a shortest remaining useful life is the most limiting of the determined degradation mechanisms.

14. The system of claim 8, further comprising:
- a plurality of sensors, each sensor configured to continuously sense a parameter within one of the engines and supply sensor data representative thereof to one of the engine controls,
- wherein the engine control is further configured to continuously update each of the different degradation mechanisms based on the plurality of sensed parameters.

15. The system of claim 8, wherein:
- each of the plurality of engines generates an output torque; and
- the system further comprises a combining gear box coupled to each engine and configured to combine the output torque generated by each engine.

16. The system of claim 8, further comprising:
- a display device in operable communication with, and coupled to receive image rendering display commands from, each of the engine controls, the display device configured, upon receipt of the image rendering display commands, to render images,
- wherein each engine control is further configured to at least selectively supplying image rendering display commands that cause the display device to render images of one or more of the plurality of different degradation mechanisms of each engine.

17. A method of adaptively managing a first engine and a second engine in a twin-engine system, the first and second engines each comprising hot gas components and non-hot gas components, and the first and second engines each exhibiting a performance margin and a remaining useful life, the method comprising the steps of:
- continuously, and in real-time, determining, in a first engine control, a first engine performance-based degradation mechanism for the first engine, the first engine performance-based degradation mechanism based on the performance margin of the first engine;
- continuously, and in real-time, determining, in a second engine control, a second engine performance-based degradation mechanism for the second engine, the second engine performance-based degradation mechanism based on the performance margin of the second engine;
- continuously, and in real-time, determining, in the first engine control, a first engine hot-gas-component-based degradation mechanism for the first engine, the first engine hot-gas-component-based degradation mechanism based on modeled failure predictions of hot gas components within the first engine;
- continuously, and in real-time, determining, in the second engine control, a second engine hot gas component-based degradation mechanism for the second engine, the second engine hot-gas-component-based degradation mechanism based on modeled failure predictions of hot gas components within the second engine;
- continuously, and in real-time, determining, in the first engine control, a first engine non-hot-gas-component-based degradation mechanism for the first engine, the first engine non-hot-gas-component-based degradation mechanism based on modeled failure predictions of non-hot gas components within the first engine;
- continuously, and in real-time, determining, in the second engine control, a second engine non-hot-gas-component-based degradation mechanism for the second engine, the second engine non-hot-gas-component-based degradation mechanism based on modeled failure predictions of non-hot gas components within the second engine;
- continuously, and in real-time, determining, in the first and second engine controls, which of the determined degradation mechanisms is most limiting;
- controlling the first and second engines, using the first and second engine controls, respectively, based on the most limiting degradation mechanism, in a manner that the remaining useful lives of the first and second engines are substantially equal;
- selectively enabling, in the first and second engine controls, engine operations of the first and second engines, respectively, above predetermined nominal engine operating limits; and
- upon enabling engine operations above the predetermined nominal engine operating limits, increasing the operational limits associated with the first and second engine performance analyses.

* * * * *